United States Patent
Kajiyama

(10) Patent No.: US 7,110,854 B2
(45) Date of Patent: Sep. 19, 2006

(54) NUMERICAL CONTROL APPARATUS FOR MACHINE TOOL AND NUMERICAL CONTROL METHOD FOR MACHINE TOOL

(75) Inventor: Takehisa Kajiyama, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 324 days.

(21) Appl. No.: 10/859,882

(22) Filed: Jun. 2, 2004

(65) Prior Publication Data

US 2005/0113959 A1    May 26, 2005

(30) Foreign Application Priority Data

Jun. 3, 2003    (JP)    ............. P. 2003-157666

(51) Int. Cl.
*G06F 19/00* (2006.01)
(52) U.S. Cl. ............. 700/188; 700/181; 318/570
(58) Field of Classification Search ............. 700/181, 700/188; 318/568.1, 568.25, 570
See application file for complete search history.

(56) References Cited

U.S. PATENT DOCUMENTS

| | | | | |
|---|---|---|---|---|
| 4,884,014 A | * | 11/1989 | Itoh | ............. 318/600 |
| 6,182,544 B1 | | 2/2001 | Chen | |
| 6,400,998 B1 | * | 6/2002 | Yamazaki et al. | ............. 700/86 |
| 6,909,937 B1 | * | 6/2005 | Sugiyama et al. | ............. 700/173 |

FOREIGN PATENT DOCUMENTS

| | | |
|---|---|---|
| EP | 1 071 002 A1 | 1/2001 |
| EP | 1 122 624 A2 | 8/2001 |
| JP | 2001-170843 | 6/2001 |

OTHER PUBLICATIONS

Concise Statement of Relevancy for JP-A-2001-170843 (1 page).
Patent Abstracts of Japan, Publication No. 2001-170843, publication date: Jun. 26, 2001 (1 page).
European Search Report dated Feb. 21, 2006.

* cited by examiner

*Primary Examiner*—Leo Picard
*Assistant Examiner*—Sheela S. Rao
(74) *Attorney, Agent, or Firm*—Osha Liang L.L.P.

(57) ABSTRACT

A numerical control apparatus for machine tool, including: an NC program storage portion; an electronic cam data transformation unit which transforms an NC program into electronic cam data; a constant circumferential velocity control command detection unit which detects whether a command for executing constant circumferential velocity control is present or not in the NC program; a reference axis pitch setting unit which sets the pitch for generating data; a main shaft rotational velocity calculation unit which calculates the rotational velocity of a main shaft on the basis of parameters corresponding to the position of a cutting edge of a tool; an axial feed velocity calculation unit which calculates axial feed velocity on the basis of the calculated rotational velocity of the main shaft; and an axial position data computing unit which calculates axial position on the basis of the axial feed velocity obtained at intervals of the set pitch.

8 Claims, 6 Drawing Sheets

NUMERICAL CONTROL APPARATUS FOR MACHINE TOOL AND NUMERICAL CONTROL METHOD FOR MACHINE TOOL

BACKGROUND OF THE INVENTION

1. Field of the Invention

The present invention relates to a numerical control apparatus for machine tool and a numerical control method for machine tool. Particularly it relates to a numerical control apparatus and method in which circumferential velocity can be controlled to be kept constant even in operation under electronic cam program control to thereby attain regulation of cutting velocity and improvement in machining accuracy and in which efficiency in transformation of an NC program into an electronic cam program can be improved to thereby attain improvement in machining efficiency.

2. Description of the Related Art

There is commonly known a numerical control machine tool used for machining a material into a desired shape by using a tool such as a cutter in the condition that the material is set in the machine tool. For example, the numerical control machine tool operates as follows. A numerical control program (NC program) is generated. Respective portions inclusive of the tool such as a cutter are operated automatically by the NC program to thereby obtain a product machined into a desired shape.

The NC program per se generated for obtaining such a machined product can be generally generated and corrected on the numerical control machine tool. When, for example, nonconformity that the machined product does not satisfy tolerance on design is detected as a result of trial cutting of the machined product, the NC program can be corrected on the machine tool side to eliminate the nonconformity. As a result, high working efficiency can be provided.

On the other hand, use of an electronic cam program instead of the NC program is known. A material set in a machine tool is machined into a desired shape by use of a tool such as a cutter under control using the electronic cam program. For example, control using the electronic cam program has been disclosed in JP-A-2001-170843.

That is, as disclosed in JP-A-2001-170843, command data of a moving axis at every moment is generated on the basis of rotation position data generated at every moment by a pulse signal output from a pulse encoder mounted on a reference axis and command position data of the moving axis set in accordance with unit rotation position of the reference axis. Command velocity data of the moving axis in synchronism with the rotational velocity of a rotary object is generated on the basis of the moving command data and the rotation position data. The position of a tool is controlled on the basis of the moving command data and the command velocity data generated as described above. In the numerical control machine tool using this type electronic cam program, respective position data of a tool and a workpiece with respect to an accumulated rotation angle of a main shaft are decided. There is an advantage that machining can be made accurately in a short time compared with the numerical control machine tool using the NC program.

Generally, graphic information, designated machining paths, machining steps, tool information, tooling information, etc. are input to a CAM software or the like installed in a personal computer or the like provided separately from the numerical control machine tool to thereby generate this type electronic cam program. It is conceived that a certain kind of transformer software is used for transforming an NC program into an electronic cam program.

SUMMARY OF THE INVENTION

According to the background-art configuration, the following problem occurs.

That is, there is a problem that so-called "constant circumferential velocity control" cannot be made when the machine tool is operated by the electronic cam program. It is therefore necessary to once change the operating mode back to the NC program operating mode for execution of constant circumferential velocity control.

The constant circumferential velocity control will be described. First, cutting velocity (Vc) at the time of cutting is calculated by the following expression (I):

$$Vc = \Pi \cdot Dm \cdot n / 1000 \text{ (m/min)} \tag{I}$$

in which Vc is cutting velocity, Dm is the diameter (mm) of a material to be cut (workpiece), and $\underline{n}$ is the rotational velocity (rpm) of the main shaft.

The "constant circumferential velocity control" means a control method by which the rotational velocity (n) of the main shaft is changed in accordance with the diameter (Dm) of the workpiece so that the cutting velocity (Vc) is kept at a certain constant value.

The constant circumferential velocity control in the NC program is carried out as follows. The rotational velocity of the main shaft is calculated at every control cycle on the basis of the distance between the center of the workpiece and the cutting position of a designated cutter axis. The calculated value of the rotational velocity of the main shaft is sent to a main shaft control portion to thereby control the cutting velocity to be kept constant.

On the other hand, in the electronic cam control, the position of each axis needs to be calculated at intervals of a certain time so that curve table data are generated in advance. Generally, the main shaft is however low in following response to the command because the main shaft cannot be predictively controlled. For this reason, it is difficult to change the rotational velocity of the main shaft according to data by calculating the rotational velocity of the main shaft at intervals of a certain time in advance. Moreover, because the actual change of the rotational velocity of the main shaft cannot be predicted, there is the situation that calculation of the position of the cutter axis for setting the feed velocity at a command value F (mm/rev) designated in advance cannot be made.

Therefore, as described above, the operating mode must be once changed back to the NC program operating mode when constant circumferential velocity control is to be executed. This causes lowering of efficiency in transformation of the NC program into the electronic cam program and brings a barrier to improvement in machining efficiency.

Under such circumstances, an object of the invention is to provide a numerical control apparatus for machine tool and a numerical control method for machine tool, in which constant circumferential velocity control can be made even under control using an electronic cam program to thereby improve machining accuracy and shorten machining time and in which efficiency in transformation of an NC program into the electronic cam program can be improved to thereby attain improvement in machining efficiency.

(1) To achieve the foregoing object, the invention provides a numerical control apparatus for machine tool, including:
an NC program storage portion for storing an NC program generated for machining a material into a desired shape; an electronic cam data transformation unit for transforming the NC program stored in the NC program storage portion into electronic cam data; a constant circumferential velocity control command detection unit for detecting whether a command for executing constant circumferential velocity control to keep the velocity of cutting substantially constant during cutting is present in the NC program stored in the NC program storage portion; a reference axis pitch setting unit for setting the pitch for generating data; a main shaft rotational velocity calculation unit for calculating the rotational velocity of a main shaft on the basis of parameters corresponding to the position of a cutting edge of a tool on the assumption that the velocity of cutting is kept at a desired value when a constant circumferential velocity control command is detected by the constant circumferential velocity control command detection unit; an axial feed velocity calculation unit for calculating axial feed velocity on the basis of the rotational velocity of the main shaft calculated by the main shaft rotational velocity calculation unit; and an axial position data computing unit for calculating axial position on the basis of the axial feed velocity obtained by the axial feed velocity calculation unit at intervals of the pitch set by the reference axis pitch setting unit.

(2) The invention also provides a numerical control apparatus for machine tool according to the paragraph (1), further including an axial feed limit velocity calculation unit for calculating a limit value of the axial feed velocity, wherein the axial position data computing unit compares the axial feed velocity calculated by the axial feed velocity calculation unit with the limit value of the axial feed velocity calculated by the axial feed limit velocity calculation unit and calculates axial position so that the axial feed velocity does not exceed the limit value of the axial feed velocity.

(3) The invention further provides a numerical control apparatus for machine tool according to the paragraph (2), wherein the axial position data computing unit compares the axial feed velocity calculated by the axial feed velocity calculation unit with the limit value of the axial feed velocity calculated by the axial feed limit velocity calculation unit and calculates axial position so that the axial feed velocity is selected when the axial feed velocity is smaller than the limit value of the axial feed velocity but the limit value of the axial feed velocity is selected when the axial feed velocity is not smaller than the limit value of the axial feed velocity.

(4) The invention further provides a numerical control apparatus for machine tool according to the paragraph (2) or (3), wherein the limit value of the axial feed velocity is decided on the basis of the performance of an axial drive motor.

(5) The invention further provides a numerical control method for machine tool, including the steps of: (a) reading an NC program; and (b) transforming the NC program read by the step (a) into electronic cam data, wherein the step (b) includes the sub-steps of: (b-1) detecting whether a command for executing constant circumferential velocity control to keep cutting velocity substantially constant during cutting is present in the NC program or not; (b-2) setting a pitch for generating data; (b-3) calculating the rotational velocity of a main shaft on the basis of parameters corresponding to the position of a cutting edge of a tool on the assumption that the cutting velocity is kept at a desired value when the constant circumferential velocity control command is detected; (b-4) calculating axial feed velocity on the basis of the rotational velocity of the main shaft calculated by the step (b-3); and (b-5) calculating axial position on the basis of the axial feed velocity at intervals of the data generation pitch.

(6) The invention further provides a numerical control method for machine tool according to the paragraph (5), further including the steps of: (c) calculating a limit value of the axial feed velocity; and (d) comparing the calculated axial feed velocity with the limit value of the axial feed velocity and calculating axial position so that the axial feed velocity does not exceed the limit value of the axial feed velocity.

(7) The invention further provides a numerical control method for machine tool according to the paragraph (6), wherein the step (d) includes the sub-steps of: (d-1) comparing the calculated axial feed velocity with the limit value of the axial feed velocity and calculating axial position so that the calculated axial feed velocity is selected when the calculated axial feed velocity is smaller than the limit value of the axial feed velocity; and (d-2) comparing the calculated axial feed velocity with the limit value of the axial feed velocity and calculating axial position so that the limit value of the axial feed velocity is selected when the calculated axial feed velocity is not smaller than the limit value of the axial feed velocity.

(8) The invention further provides a numerical control method for machine tool according to the paragraph (6) or (7), wherein the limit value of the axial feed velocity is decided on the basis of the performance of an axial drive motor.

That is, the numerical control apparatus for machine tool according to the invention includes: an NC program storage portion for storing an NC program generated for machining a material into a desired shape; an electronic cam data transformation unit for transforming the NC program stored in the NC program storage portion into electronic cam data; a constant circumferential velocity control command detection unit for detecting whether a command for executing constant circumferential velocity control to keep the velocity of cutting substantially constant during cutting is present in the NC program stored in the NC program storage portion; a reference axis pitch setting unit for setting the pitch for generating data; a main shaft rotational velocity calculation unit for calculating the rotational velocity of a main shaft on the basis of parameters corresponding to the position of a cutting edge of a tool on the assumption that the velocity of cutting is kept at a desired value when a constant circumferential velocity control command is detected by the constant circumferential velocity control command detection unit; an axial feed velocity calculation unit for calculating axial feed velocity on the basis of the rotational velocity of the main shaft calculated by the main shaft rotational velocity calculation unit; and an axial position data computing unit for calculating axial position on the basis of the axial feed velocity obtained by the axial feed velocity calculation unit at intervals of the pitch set by said reference axis pitch setting unit. Accordingly, constant circumferential velocity control can made even under control using the electronic cam program because the cutting velocity can be kept at a desired value and because the rotational velocity of the main shaft can be computed on the assumption of the position of the cutting edge of the tool. Accordingly, improvement in machining accuracy and reduction in machining time can be attained. Moreover, efficiency in transformation of the NC program into the electronic cam program can be improved to thereby attain improvement in machining efficiency.

On this occasion, it is conceived that axial position is calculated so that the axial feed velocity does not exceed its limit value. Accordingly, maintenance of the health of the apparatus can be attained.

For example, it is conceived that control in consideration of the limit value of the axial feed velocity is carried out as follows. The axial feed velocity calculated by the axial feed velocity calculation unit is compared with the limit value of the axial feed velocity calculated by the limit velocity calculation unit. When the calculated axial feed velocity is smaller than the limit value of the axial feed velocity, the calculated axial feed velocity is selected for calculating the axial position. When the calculated axial feed velocity is not smaller than the limit value of the axial feed velocity, the limit value of the axial feed velocity is selected for calculating the axial position.

For example, it is conceived that the limit value is decided on the basis of the performance of an axial drive motor.

Each of the paragraphs (5) to (8) may be provided in the form of a program.

BRIEF DESCRIPTION OF THE DRAWING

These and other objects and advantages of this invention will become more fully apparent from the following detailed description taken with the accompanying drawings in which.

DETAILED DESCRIPTION OF THE PREFERRED EMBODIMENTS

An embodiment of the invention will be described below with reference to FIGS. 1 to 4.

Figure 1:
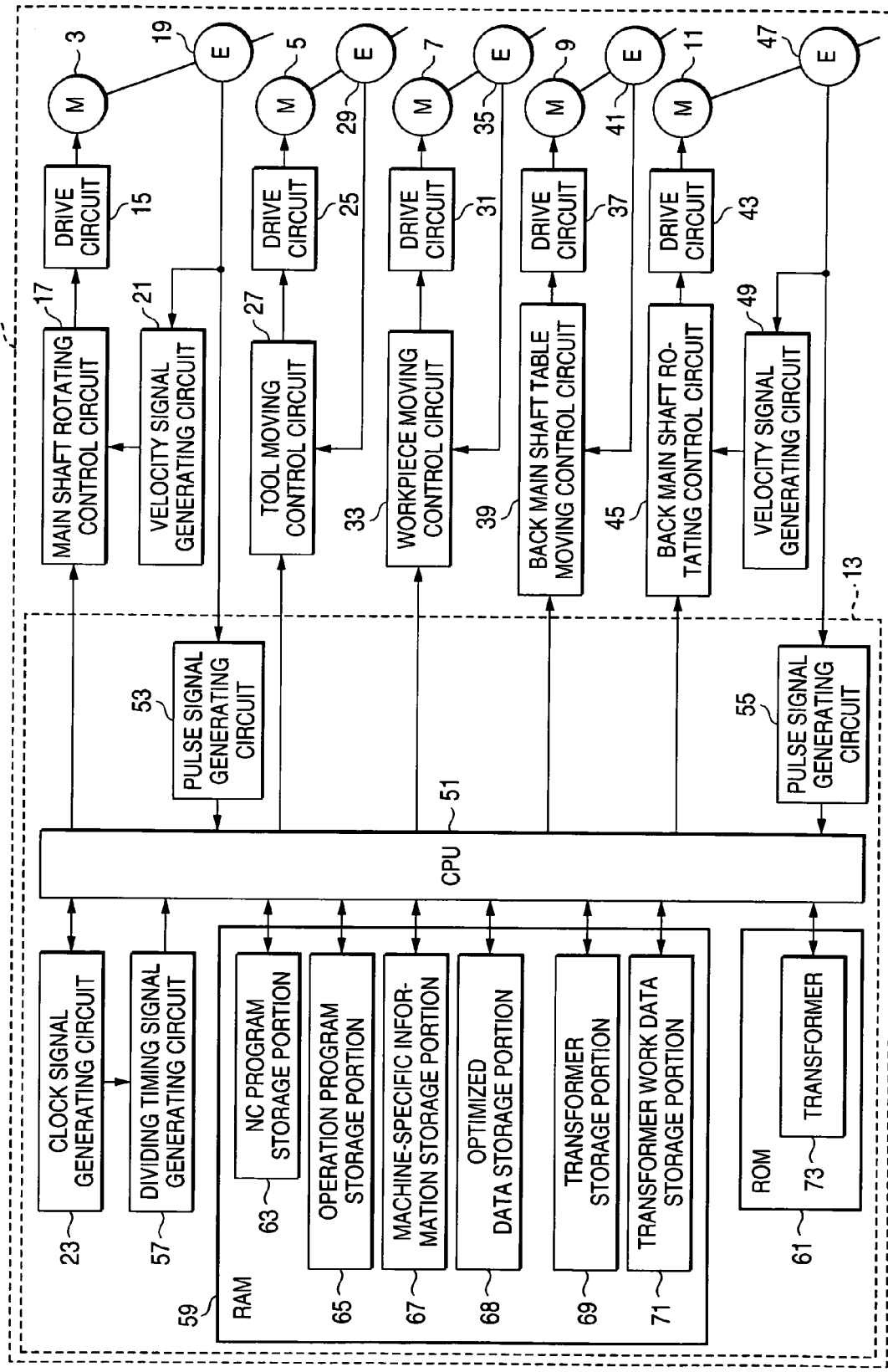
FIG. 1 is a block diagram showing the configuration of a numerical control machine tool according to a first embodiment of the invention.
Figure 2:
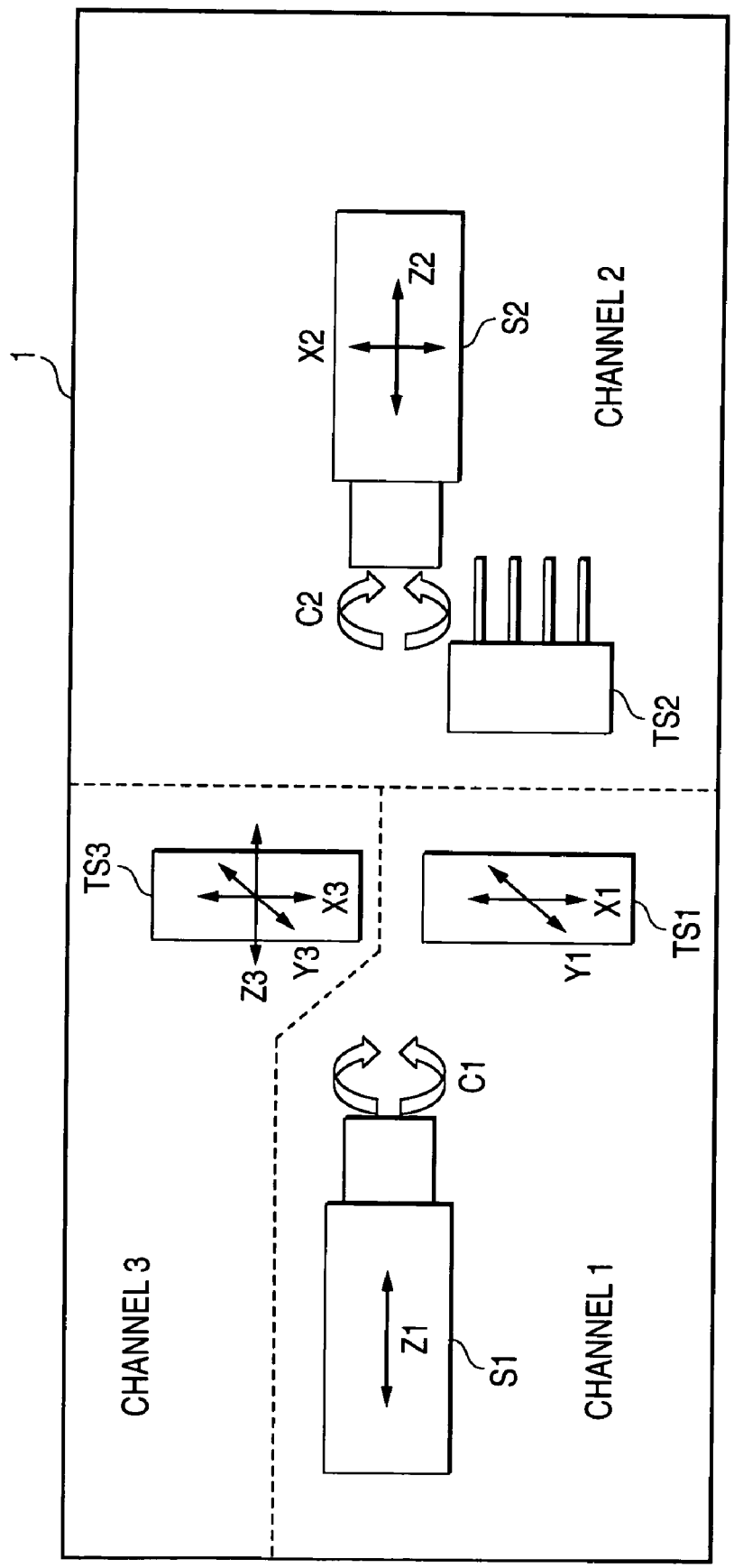
FIG. 2 is a plan view showing the channel configuration of the numerical control machine tool according to the first embodiment of the invention.

FIG. 1 is a block diagram showing the overall configuration of a numerical control machine tool according to this embodiment. FIG. 2 is a plan view showing the schematic control axis configuration of the numerical control machine tool. In FIG. 1, the numerical control machine tool 1 includes a main shaft rotating motor 3, a tool moving motor 5, a workpiece moving motor 7, a back main shaft moving motor 9, a back main shaft rotating motor 11, and a control unit portion 13 for controlling drives of the main shaft rotating motor 3, the tool moving motor 5, the workpiece moving motor 7, the back main shaft moving motor 9 and the back main shaft rotating motor 11.

The main shaft rotating motor 3 is provided so that a main shaft (designated by the symbol S1 in FIG. 2) formed so as to be able to hold a workpiece is driven to rotate. The main shaft rotating motor 3 is connected to the control unit portion 13 through a drive circuit 15 and a main shaft rotating control circuit 17. The main shaft rotating motor 3 is provided with a pulse encoder 19 for detecting rotation of the main shaft rotating motor 3. An output of the pulse encoder 19 is connected to the control unit portion 13 and a velocity signal generating circuit 21, so that a rotation detection signal output from the pulse encoder 19 is supplied to the control unit portion 13 and the velocity signal generating circuit 21. The pulse encoder 19 generates a rotation detection signal in synchronism with the rotation of the main shaft rotating motor 3 and supplies the rotation detection signal to the control unit portion 13 and the velocity signal generating circuit 21. The velocity signal generating circuit 21 converts the rotation detection signal output from the pulse encoder 19 into a main shaft rotation velocity signal expressing the rotational velocity of the main shaft rotating motor 3. An output of the velocity signal generating circuit 21 is connected to the main shaft rotating control circuit 17, so that the main shaft rotation velocity signal obtained by conversion is supplied to the main shaft rotating control circuit 17.

The main shaft rotating control circuit 17 is provided for controlling the rotation of the workpiece (grasped on the main shaft S1) by referring to a clock signal generated/output from a clock signal generating circuit 23 so that the workpiece can rotate at a desired rotational velocity. The main shaft rotating control circuit 17 compares the main shaft rotation velocity signal output from the velocity signal generating circuit 21 with a main shaft rotation velocity command signal output from the control unit portion 13 and generates a control signal corresponding to the difference between the main shaft rotation velocity signal and the main shaft rotation velocity command signal by referring to the clock signal. The control signal generated by the main shaft rotating control circuit 17 is supplied to the drive circuit 15.

The drive circuit 15 controls electric power supplied to the main shaft rotating motor 3 on the basis of the control signal output from the main shaft rotating control circuit 17 so that the rotational velocity of the main shaft rotating motor 3 (main shaft S1) is set at a main shaft rotation velocity command value which will be described later. The drive circuit 15, the main shaft rotating control circuit 17 and the velocity signal generating circuit 21 form a feedback control system for feeding back the rotational velocity of the main shaft rotating motor 3 (main shaft S1).

Next, the tool moving motor 5 is provided so that tools (such as turning cutters designated by the symbols TS1 and TS3 in FIG. 2) for machining the workpiece are moved, for example, in directions (X-axis direction or Y-axis direction) perpendicular to the rotation center axis of the main shaft rotating motor 3 (main shaft S1) and in a direction (Z-axis direction) parallel to the main shaft. The tool moving motor 5 is connected to the control unit portion 13 through a drive circuit 25 and a tool moving control circuit 27.

Incidentally, in this embodiment, as shown in FIG. 2, the tool TS1 is formed so as to be controlled to move in the X1-axis direction and the Y1-axis direction whereas the tool TS3 is formed so as to be controlled to move in the X3-axis direction, the Y3-axis direction and the Z3-axis direction.

Besides the tools TS1 and TS3, a back machining tool TS2 is provided.

The tool moving motor 5 is provided with a pulse encoder 29 for detecting the rotation of the tool moving motor 5. An output of the pulse encoder 29 is connected to the tool moving control circuit 27, so that a rotation detection signal output from the pulse encoder 29 is supplied to the tool moving control circuit 27. The pulse encoder 29 generates a rotation position signal at intervals of a predetermined rotation angle of the tool moving motor 5 and supplies the rotation position signal to the tool moving control circuit 27.

The tool moving control circuit 27 recognizes the actual position of each of the moved tools TS1 and TS3 on the basis of the rotation position signal output from the pulse encoder 29. At the same time, the tool moving control circuit 27 compares the recognized actual position of each of the moved tools TS1 and TS3 with a tool position command signal output from the control unit portion 13 (which will be described later) and generates a tool drive signal on the basis of a result of the comparison. The tool drive signal generated by the tool moving control circuit 27 is supplied to the drive circuit 25. The drive circuit 25 controls electric power supplied to the tool moving motor 5 on the basis of the tool drive signal output from the tool moving control circuit 27. The drive circuit 25 and the tool moving control circuit 27 form a feedback control system for feeding back the positions of the moved tools TS1 and TS3.

Next, the workpiece moving motor 7 is provided for moving the workpiece, for example, in a direction (Z1-axis direction) parallel to the rotation center axis of the main shaft rotating motor 3 (main shaft S1). The workpiece moving motor 7 is connected to the control unit portion 13 through a drive circuit 31 and a workpiece moving control circuit 33. The workpiece moving motor 7 is provided with a pulse encoder 35 for detecting the rotation of the workpiece moving motor 7. An output of the pulse encoder 35 is connected to the workpiece moving control circuit 33, so that a rotation detection signal output from the pulse encoder 35 is supplied to the workpiece moving control circuit 33. The pulse encoder 35 generates a rotation detection signal at intervals of a predetermined rotation angle of the workpiece moving motor 7 an supplies the rotation detection signal to the workpiece moving control circuit 33.

The workpiece moving control circuit 33 recognizes the actual position of the moved workpiece on the basis of the rotation detection signal output from the pulse encoder 35. At the same time, the workpiece moving control circuit 33 compares the recognized actual position of the moved workpiece with a workpiece position command signal output from the control unit portion 13 and generates a workpiece drive signal on the basis of a result of the comparison. The workpiece drive signal generated at intervals of the predetermined rotation angle is supplied to the drive circuit 31. The drive circuit 31 controls electric power supplied to the workpiece moving motor 7 on the basis of the workpiece drive signal output at intervals of the predetermined rotation angle. The drive circuit 31 and the workpiece moving control circuit 33 form a feedback control system for feeding back the position of the moved workpiece.

Next, the back main shaft table moving motor 9 is provided for moving a back main shaft S2, for example, in a direction (Z2-axis direction) parallel to the rotation center axis of the main shaft rotating motor 3 (main shaft S1) and in a direction (X2-axis direction) perpendicular to the Z2-axis direction. The back main shaft table moving motor 9 is connected to the control unit portion 13 through a drive circuit 37 and a back main shaft table moving control circuit 39. The back main shaft table moving motor 9 is provided with a pulse encoder 41 for detecting the rotation of the back main shaft table moving motor 9. An output of the pulse encoder 41 is connected to the back main shaft table moving control circuit 39, so that a rotation detection signal output from the pulse encoder 41 is supplied to the back main shaft table moving control circuit 39. The pulse encoder 41 generates a rotation position signal at intervals of a predetermined rotation angle of the back main shaft table moving motor 9 and supplies the rotation position signal to the back main shaft table moving control circuit 39.

The back main shaft table moving control circuit 39 recognizes the actual position of the moved back main shaft S2 on the basis of the rotation detection signal output from the pulse encoder 41. At the same time, the back main shaft table moving control circuit 39 compares the recognized actual position of the moved back main shaft S2 with a back main shaft table position command signal output from the control unit portion 13 (which will be described later) and generates a back main shaft table drive signal on the basis of a result of the comparison. The back main shaft table drive signal generated by the back main shaft table moving control circuit 39 is supplied to the drive circuit 37. The drive circuit 37 controls electric power supplied to the back main shaft table moving motor 9 on the basis of the drive signal output from the back main shaft table moving control circuit 39. The drive circuit 37 and the back main shaft table moving control circuit 39 form a feedback control system for feeding back the position of the moved back main shaft table.

Next, the back main shaft rotating motor 11 is provided so that the back main shaft S2 formed so as to be able to hold the workpiece is driven to rotate in a C2 direction. The back main shaft rotating motor 11 is connected to the control unit portion 13 through a drive circuit 43 and a back main shaft rotating control circuit 45. The back main shaft rotating motor 11 is provided with a pulse encoder 47 for detecting the rotation of the back main shaft rotating motor 11. An output of the pulse encoder 47 is connected to the control unit portion 13 and a velocity signal generating circuit 49, so that a rotation detection signal output from the pulse encoder 47 is supplied to the control unit portion 13 and the velocity signal generating circuit 49. The pulse encoder 47 generates a rotation detection signal in synchronism with the rotation of the back main shaft rotating motor 11 (back main shaft S2) and supplies the rotation detection signal to the control unit portion 13 and the velocity signal generating circuit 49. The velocity signal generating circuit 49 converts the rotation detection signal output from the pulse encoder 47 into a back main shaft rotation velocity signal indicating the rotational velocity of the back main shaft rotating motor 11 (back main shaft S2). An output of the velocity signal generating circuit 49 is connected to a back main shaft rotating control circuit 45, so that the back main shaft rotation velocity signal obtained by the conversion is supplied to the back main shaft rotating control circuit 45.

The back main shaft rotating control circuit 45 is provided for controlling the rotation of the workpiece (back main shaft S2) to obtain a desired rotational velocity by referring to the clock signal generated/supplied by the clock signal generating circuit 23. The back main shaft rotating control circuit 45 compares the back main shaft rotation velocity signal output from the velocity signal generating circuit 49 with a back main shaft rotation velocity command signal output from the control unit portion 13 and generates a control signal corresponding to the difference between the back main shaft rotation velocity signal and the back main shaft rotation velocity command signal by referring to the clock signal. The control signal generated by the back main shaft rotating control circuit 45 is supplied to the drive circuit 43.

The drive circuit 43 controls electric power supplied to the back main shaft rotating motor 11 on the basis of the control signal output from the back main shaft rotating control circuit 45 so that the rotational velocity of the back main shaft rotating motor 11 (back main shaft S2) is set at aback main shaft rotation velocity command value which will be described later. The drive circuit 43, the back main shaft rotating control circuit 45 and the velocity signal generating circuit 49 form a feedback control system for feeding back the rotational velocity of the back main shaft rotating motor 11 (back main shaft S2).

As shown in FIG. 1, the control unit portion 13 has a central processing unit (CPU) 51, pulse signal generating circuits 53 and 55, a clock signal generating circuit 23 as described above, a dividing timing signal generating circuit 57, an RAM 59, and an ROM 61.

The CPU 51 is a computing portion for conducting signal processing of the control unit portion 13 as a whole. The CPU 51 performs known multiprocessing. Multiprocessing is used for processing a plurality of jobs (programs) apparently simultaneously in such a manner that the plurality of programs are stored in advance and executed while switched in a short time. There is known multiprocessing of the type performing time-division processing or multiprocessing of the type performing task processing while switching respective jobs in descending order of set priority.

The pulse signal generating circuits 53 and 55 are connected to the pulse encoders 19 and 47 respectively. The rotation detection signals output from the pulse encoders 19 and 47 respectively are supplied to the pulse signal generating circuits 53 and 55 through an interface (I/F) not shown. Each of the pulse signal generating circuits 53 and 55 is formed to generate a pulse signal at intervals of a predetermined rotation angle on the basis of the rotation detection signal received. The pulse signal generating circuits 53 and 55 are also connected to the CPU 51. Each of the pulse signal generating circuits 53 and 55 is formed so that the pulse signal generated at intervals of the predetermined rotation angle is supplied to the CPU 51. In this embodiment, each of the pulse signal generating circuits 53 and 55 is formed so that 4096 pulses are output at regular intervals in synchronism with the main shaft rotating motor 3 (main shaft S1) or the back main shaft rotating motor 11 (back main shaft S2) while the main shaft rotating motor 3 (main shaft S1) or the back main shaft rotating motor 11 (back main shaft S2) makes one rotation.

The clock signal generating circuit 23 is formed so that a clock signal is generated and output at intervals of a predetermined period, for example, of 0.25 msec when a predetermined command signal output from the CPU 51 is received by the clock signal generating circuit 23. The clock signal generated by the clock signal generating circuit 23 is supplied to the dividing timing signal generating circuit 57. The dividing timing signal generating circuit 57 is formed to count the number of pulses in the clock signal output from the clock signal generating circuit 23. For example, as a result of the counting, a dividing timing signal is generated and supplied to the CPU 51 at intervals of 1 msec. Accordingly, the dividing timing signal generating circuit 57 outputs a 1 msec-cycle dividing timing signal as an interrupt timing signal which will be described later so that the interrupt timing signal is supplied to the CPU 51. Incidentally, the cycle of each of the clock signal and the dividing timing signal is not limited to the aforementioned value and can be set suitably in accordance with the throughput of the CPU 51, the resolving power of each of the pulse encoders 29, 35 and 41 and the performance of each of the motors 3, 5, 7 and 9.

The RAM 59 is formed to temporarily store results of various computations by the CPU 51 so that the results can be read from the RAM 59. The RAM 59 contains an NC program storage portion 63, an operation program storage portion 65, a machine-specific information storage portion 67, an optimized data storage portion 68, a transformer storage portion 69, and a transformer work data storage portion 71. The RAM 59 is formed to temporarily store results of various computations by the CPU 51 so that the results can be read from the RAM 59.

The NC program storage portion 63 is an area for storing a plurality of NC programs for machining various workpieces respectively. When an operation input device not shown is operated to make access to this storage area, a desired machining NC program can be selected from the plurality of NC programs.

The operation program storage portion 65 is an area for storing an NC program or an electronic cam program for actually operating the numerical control machine tool 1. That is, when the machine tool 1 is to be operated by an NC program, selected one of NC programs stored in the NC program storage portion 63 is loaded into the operation program storage portion 65 or an NC program generated through a monitor provided on an NC operation panel (not shown) is directly loaded into this area. On the other hand, when the machine tool 1 is to be operated by an optimized program inclusive of an electronic cam program, only an optimized main program is loaded into the operation program storage portion 65. (The optimized program is substantially equivalent to an NC program though the optimized program is specific at the point that the optimized program contains electronic cam codes.)

The machine-specific information storage portion 67 is an area, for example, provided for storing offset values of tools TS1, TS2 and TS3.

The ROM 61 is a storage portion for storing various kinds of processing programs inclusive of the transformer 73. Electronic cam control commands are also stored in the ROM 61.

The optimized data storage portion 68 is set as an area for storing data referred to by commands written in the optimized main program generated by optimization and transformation of the NC program. The optimized data per se are provided as a table of data indicating the loci of movement of the tools and data indicating the functions of M, G and T codes.

As described above, an NC program required for actually performing machining is stored in the operation program storage portion 65 of the RAM 59. The operation program storage portion 65 includes a first channel machining procedure storage portion, a second channel machining procedure storage portion, and a third channel machining procedure storage portion.

A portion actually operated by the NC program stored in the first, second and third channel machining procedure storage portions will be described with reference to FIG. 2.

First, the main shaft rotating motor 3 for rotating the main shaft S1, the workpiece moving motor 7 and the tool moving motor 5 are controlled by the NC program stored in the first channel machining procedure storage portion. As a result, the main shaft S1 is controlled to move in the Z1-axis direction represented by the arrow in FIG. 2 and rotate in the C1-rotation direction. On the other hand, the tool TS1 is controlled to move in the X1-axis and Y1-axis directions represented by the arrow in FIG. 2. Control in channel 1 includes moving and rotating control of the main shaft table, moving control of the tool post for supporting the tool TS1 in respective arrow directions, and rotating control of a rotary tool if the rotary tool is included in the tool TS1 and needs to be controlled.

Next, the back main shaft rotating motor 11 for rotating the back main shaft S2, the back main shaft moving motor 9 and rotation of the tool TS2 are controlled by the NC program stored in the second channel machining procedure storage portion. As a result, the back main shaft S2 is controlled to move in the Z2-axis and X2-axis directions represented by the arrows in FIG. 2 and rotate in the C2-rotation direction. On the other hand, the tool TS2 per se is placed in a fixed tool post. A non-movable tool such as a cutter or a rotary tool such as a drill can be mounted as the tool TS2. When a rotary tool such as a drill is used as the tool TS2, rotation of the tool TS2 is controlled by the NC program stored in the second channel machining procedure storage portion.

Next, the tool moving motor 5 is controlled by the NC program stored in the third channel machining procedure storage portion. As a result, the tool TS3 is controlled to move in the X3-axis, Y3-axis and Z3-axis directions represented by the arrows in FIG. 2. Control in cannel 3 includes moving control of the tool post supporting the tool TS3, and rotating control of a rotary tool if the rotary tool is included in the supported tool and needs to be controlled.

Although this embodiment has been described on the case where the tools TS3, TS2 and TS1 are allocated to channels 3, 2 and 1 respectively, the allocation of the tools TS1, TS2 and TS3 to channels may be changed in accordance with necessity. For example, the tool TS1 or TS3 may be controlled in any channel. Similarly, the allocation of the main shaft S1 and the back main shaft S2 to channels may be changed.

The operation of this embodiment will be described below on the basis of the aforementioned configuration.

Figure 3:
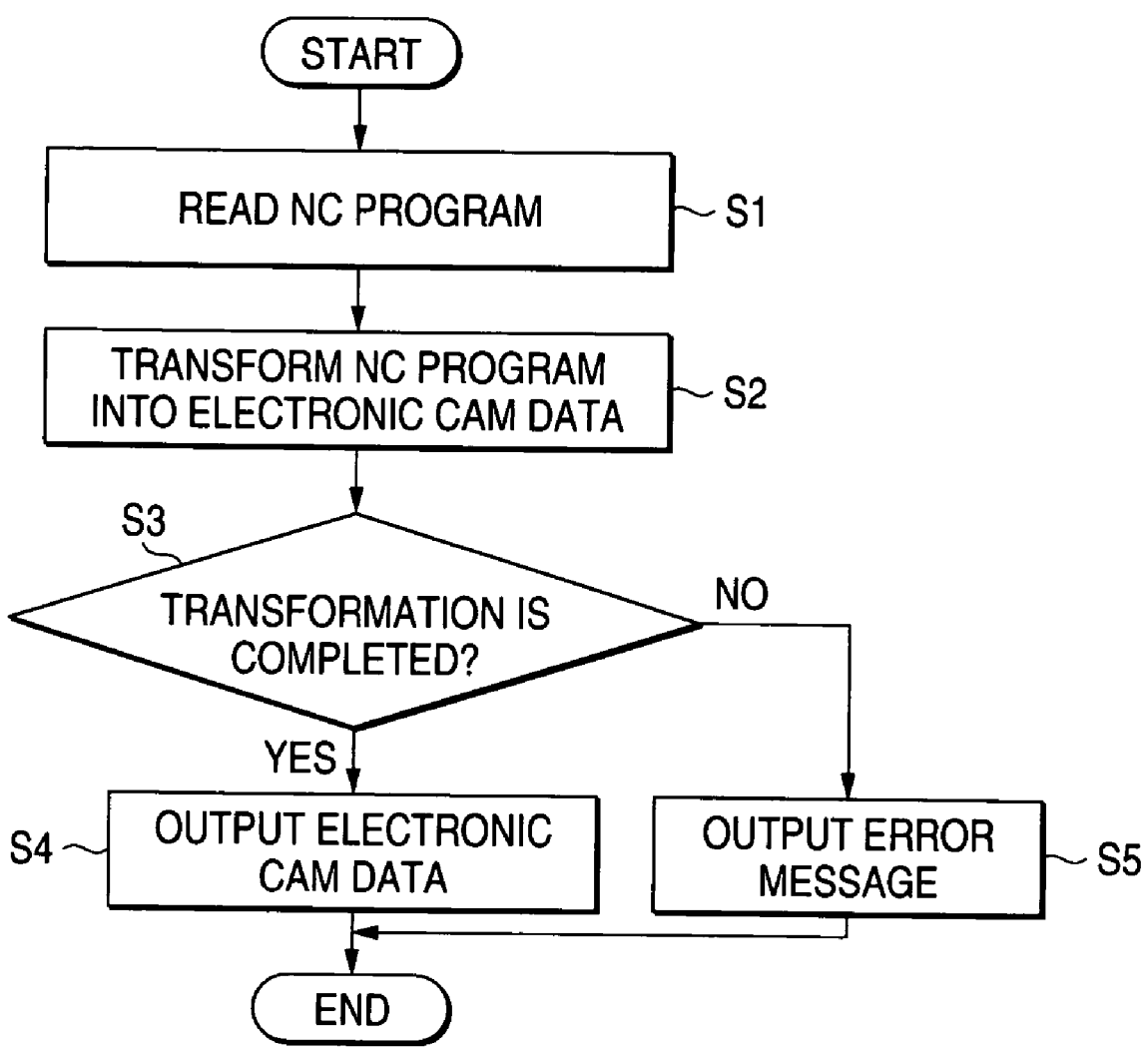
FIG. 3 is a flow chart showing the main procedure of a control program in the first embodiment of the invention.

A flow of main procedures will be described first with reference to FIG. 3. In step S1, an NC program is read. Then, in step S2, the read NC program is transformed into electronic cam data. Then, in step S3, a judgment is made as to whether transformation of the NC program into electronic cam data is completed or not. When a decision is made that the transformation of the NC program into electronic cam data is completed, the current position of the routine goes to step S4 in which the electronic cam data are output. On the other hand, when a decision is made that the transformation of the NC program into electronic cam data is not completed, the current position of the routine goes to step S5 in which an error message is output.

The main procedures have been described above.

In this embodiment, a process for making constant circumferential velocity control possible is carried out in the step S2 of transforming the NC program into electronic cam data. The process is carried out as a series of processes on the basis of detection as to whether a constant circumferential velocity control start command is present in the NC program as a subject of the transformation.

Figure 4:
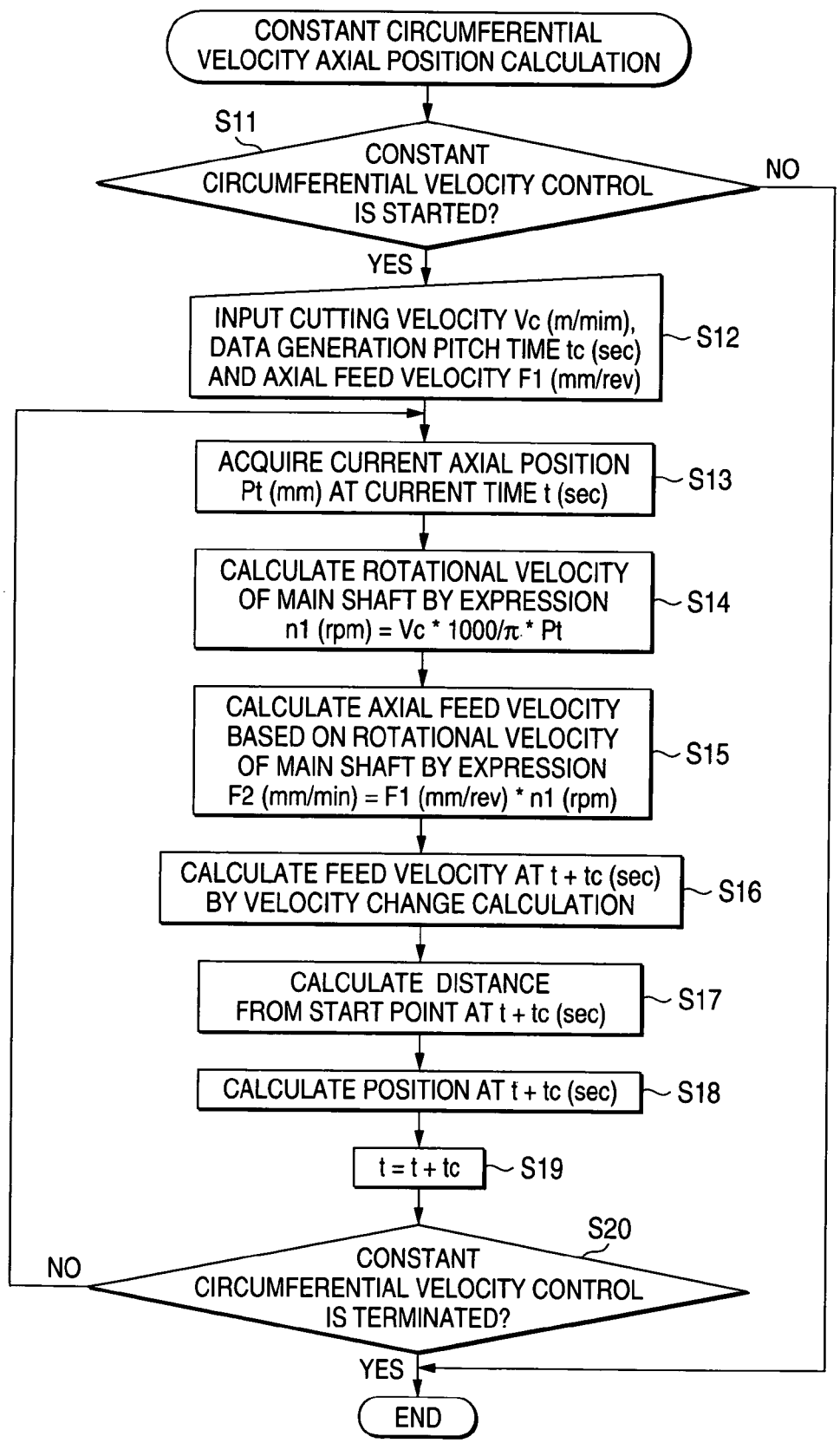
FIG. 4 is a flow chart showing the contents for constant circumferential velocity control in the first embodiment of the invention.

A process concerning constant circumferential velocity control axial position calculation will be described below in detail with reference to FIG. 4.

First, in step S11, a judgment is made as to whether the command written in a block of the read NC program is a command for constant circumferential velocity control or not. When there is no command for constant circumferential velocity control, the routine is terminated without anything to be done. On the other hand, when there is a command for constant circumferential velocity control, the current position of the routine goes to step S12. In the step S12, necessary data, that is, cutting velocity Vc (m/min) and axial feed velocity F1 (mm/rev) are read from the NC program as a source of transformation. Further, data generation pitch time tc (sec) is read from the transformer work data storage portion 71.

Then, the current position of the routine goes to step S13. In the step S13, current axial position Pt (mm) at current time t (sec) is acquired.

Incidentally, the position Pt (mm) indicates the position to be taken by the cutting edge of the cutter at the stage in which a constant circumferential velocity control start command becomes effective in the NC program.

Incidentally, the term "axial position" means an axial position along the X axis shown in FIG. 2.

Then, the current position of the routine goes to step S14. In the step S14, the rotational velocity (n1) of the main shaft is calculated. The calculation of the rotational velocity (n1) of the main shaft is based on the expression (II):

$$n1 = 1000 \cdot Vc / \Pi \cdot Pt \quad (II)$$

in which n1 is the rotational velocity (rpm) of the main shaft, Vc is the cutting velocity (m/min) acquired as a value designated in the NC program), and Pt is the current axial position (mm).

The "main shaft" used herein includes the main shaft S1 and the back main shaft S2 as shown in FIG. 2.

Then, the current position of the routine goes to step S15 in which axial feed velocity F2 (mm/min) decided on the basis of the rotational velocity (n1) of the main shaft is calculated. The axial feed velocity F2 (mm/min) is calculated on the basis of the expression (III):

$$F2(\text{mm/min}) = F1(\text{mm/rev}) \cdot n1(\text{rpm}) \quad (III)$$

in which F2 is the axial feed velocity (mm/min), F1 is the axial feed velocity per revolution (mm/rev) (acquired as a value designated in the NC program as a source of transformation), and n1 is the rotational velocity (rpm) of the main shaft.

Then, the current position of the routine goes to step S16 in which velocity changing calculation is executed with the axial feed velocity F2 (mm/min) as a target value. That is, axial feed velocity at time {t+tc (sec)} is calculated. Then, the current position of the routine goes to step S17 in which distance from the start point at time {t+tc (sec)} is calculated.

Then, the current position of the routine goes to step S18 in which axial position at time {t+tc (sec)} is calculated. Then, in step S19, t is replaced by t+tc. Then, the current position of the routine goes to step S20 in which a judgment is made as to whether constant circumferential velocity control is to be terminated or not. When constant circumferential velocity control is to be terminated, the control is terminated immediately. On the other hand, when constant circumferential velocity control is not to be terminated, the current position of the routine goes back to the step S13 to repeat the aforementioned steps.

According to this embodiment, the following effect can be obtained.

First, constant circumferential velocity control can be executed even in an operating mode using electronic cam data. As a result, improvement in machining accuracy can be attained.

In addition, efficiency in transformation of the NC program into the electronic cam program can be improved to thereby make a large contribution to improvement in machining efficiency.

Figure 5:
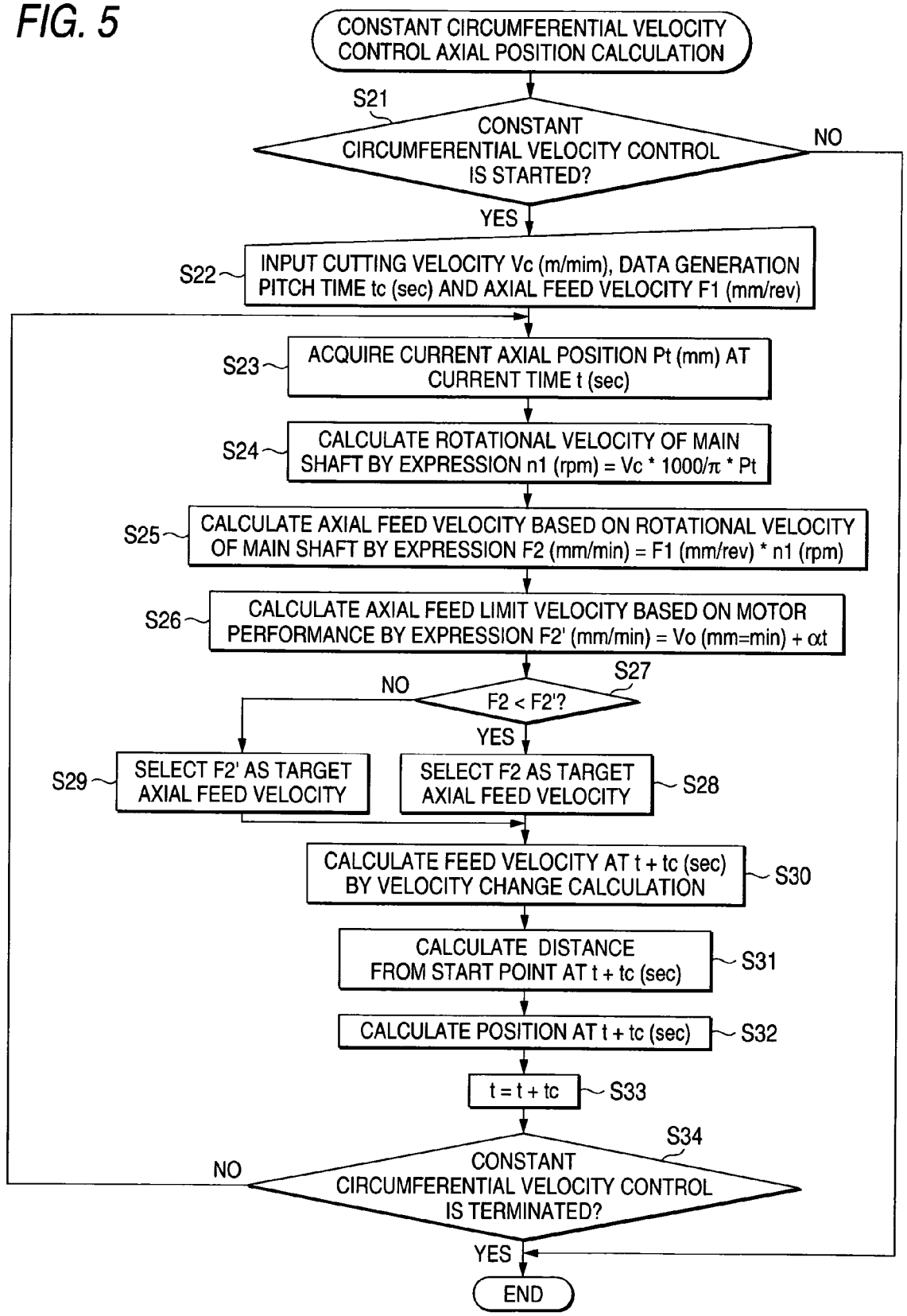
FIG. 5 is a flow chart showing the contents for constant circumferential velocity control in a second embodiment of the invention.

A second embodiment will be described below with reference to FIGS. 5 and 6. FIG. 5 is a flow chart for explaining a process concerning constant circumferential velocity control in detail.

The mechanical configuration of this embodiment is the same as that of the first embodiment.

First, in step S21, a judgment is made as to whether constant circumferential velocity control is started or not. When a decision is made that constant circumferential velocity control is not started, the routine is terminated without anything to be done. On the other hand, when constant circumferential velocity control is to be executed, the current position of the routine goes to step S22 in which necessary data, that is, cutting velocity Vc (m/min), data generation time pitch tc (sec) and axial feed velocity F1 (mm/rev) are input.

Incidentally, constants written in the NC program as a source of transformation are acquired as the cutting velocity Vc (m/min) and the axial feed velocity F1 (mm/rev). A value of 4 msec or 8 msec set in the inside of the machine tool is used as the data generation time pitch tc (sec).

Then, the current position of the routine goes to step S23 in which current axial position Pt (mm) at current time $t$ (sec) is acquired.

Incidentally, the term "axial position" means an axial position along the X axis shown in FIG. 2 as described above in the first embodiment.

Then, the current position of the routine goes to step S24. In the step S24, the rotational velocity (n1) of the main shaft is calculated. The calculation of the rotational velocity (n1) of the main shaft is executed on the basis of the expression (IV):

$$n1 = 1000 \cdot Vc/\Pi \cdot Pt \quad \text{(IV)}$$

in which n1 is the rotational velocity (rpm) of the main shaft, Vc is the cutting velocity (m/min) (acquired as a value designated in the NC program), and Pt is the current axial position (mm).

Then, the current position of the routine goes to step S25 in which axial feed velocity F2 (mm/min) decided on the basis of the rotational velocity (n1) of the main shaft is calculated. The calculation of the axial feed velocity is executed on the basis of the expression (V):

$$F2(\text{mm/min}) = F1(\text{mm/rev}) \cdot n1(\text{rpm}) \quad \text{(V)}$$

in which F2 is the axial feed velocity (mm/min), F1 is the axial feed velocity per revolution (mm/rev) (acquired as a value designated in the NC program as a source of transformation), and n1 is the rotational velocity (rpm) of the main shaft.

Then, the current position of the routine goes to step S26 in which axial feed limit velocity F2' (mm/min) decided on the basis of the performance of a motor (e.g., the tool moving motor 5 shown in FIG. 1) is calculated. The calculation of the axial feed limit velocity is executed on the basis of the expression (VI):

$$F2'(\text{mm/min}) = Vo(\text{mm/min}) + \alpha t \quad \text{(VI)}$$

in which F2' is the axial feed limit velocity (mm/min), Vo is the cutting velocity at the axial position Pt, and α is a constant indicating limit acceleration defined as the capacity of the motor.

Then, the current position of the routine goes to step S27 in which the axial feed velocity F2 (mm/min) is compared with the axial feed limit velocity F2' (mm/min). When the axial feed velocity F2 (mm/min) is lower than the axial feed limit velocity F2' (mm/min), the current position of the routine goes to step S28. On the other hand, when the axial feed velocity F2 (mm/min) is not lower than the axial feed limit velocity F2' (mm/min), the current position of the routine goes to step S29. In the step S28, the axial feed velocity F2 (mm/min) is selected as a target axial feed velocity. On the other hand, in the step S29, the axial feed limit velocity F2' (mm/min) is selected as a target axial feed velocity.

In any case, the current position of the routine goes to the next step S30. In the step S30, velocity changing calculation, that is, calculation of feed velocity at time {t+tc (sec)} is executed. Then, in step S31, distance from the start point at time {t+tc (sec)} is calculated. Then, in step S32, axial position at time {t+tc (sec)} is calculated. Then, in step S33, $t$ is replaced by t+tc (sec). Then, in step S34, a judgment is made as whether constant circumferential velocity control is to be terminated or not. When constant circumferential velocity control is to be terminated, the routine is terminated immediately. On the other hand, when constant circumferential velocity control is not to be terminated, the current position of the routine goes back to the step S23 to repeat the aforementioned steps.

A state in which a row of points for forming a locus obtained by the procedure of the flow chart shown in FIG. 5 will be described specifically with reference to FIG. 6. That is, how the position at time {t+tc (sec)} is obtained finally in the step S32 will be described by use of a result of processing in the steps S23 to S28.

Figure 6:
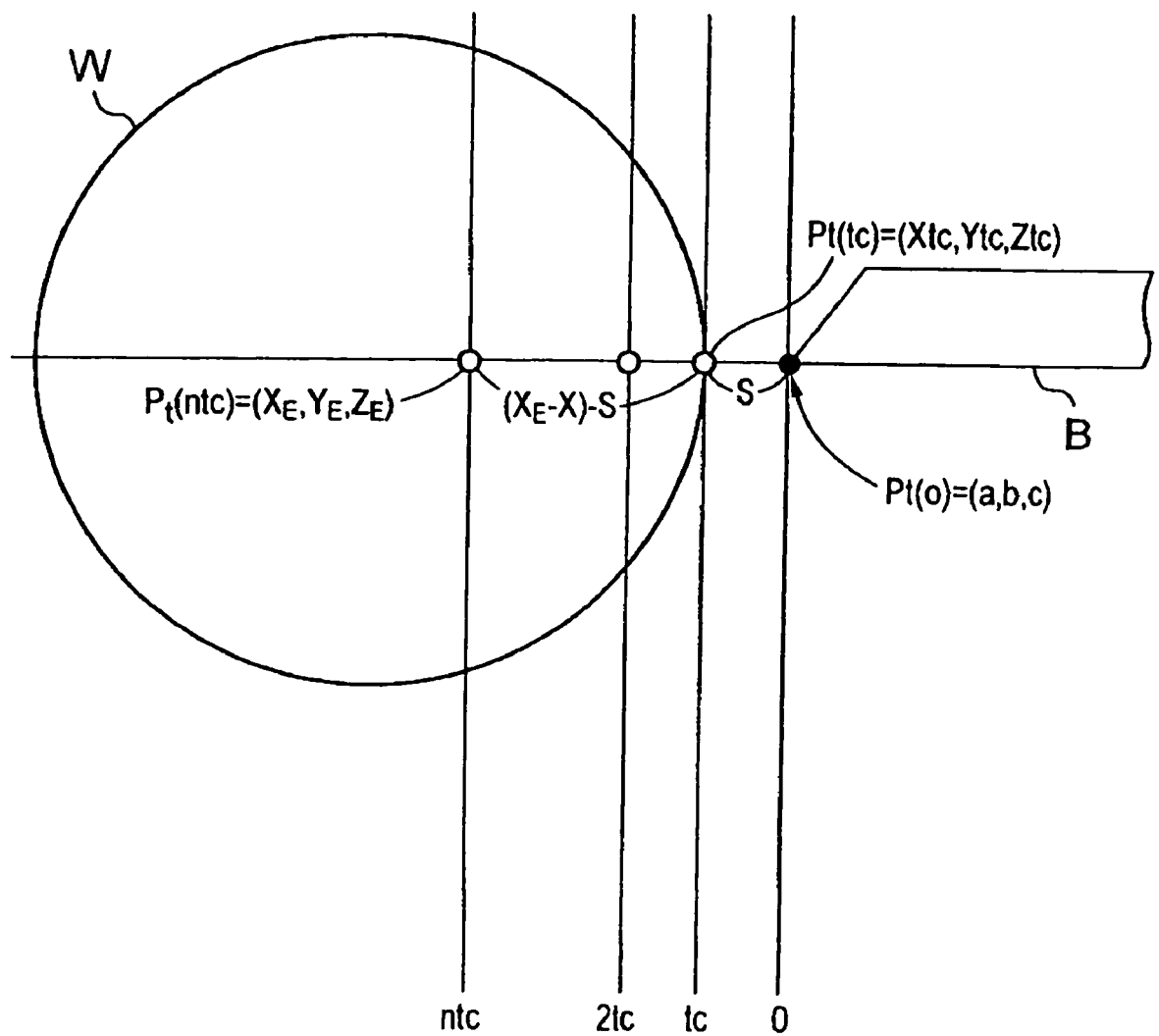
FIG. 6 is a view showing a specific example of the second embodiment of the invention.

The position of the cutting edge of the cutter B represented by the sold line in FIG. 6 is instantaneously made coincident with Pt(0)=(a, b, c) expressed as the start point of constant circumferential velocity control. Because the position of the cutting edge of the cutter B is instantaneously made coincident with this point, the cutter feed velocity takes a value equal to or near "0" at this timing. If the end point of constant circumferential velocity control is expressed by Pt (ntc)=($X_E$, $Y_E$, $Z_E$), points (coordinates) of the cutting edge moving at intervals of tc between Pt(0)=(a, b, c) and Pt(ntc)=($X_E$, $Y_E$, $Z_E$) are obtained in the following calculation.

Incidentally, the symbol W in FIG. 6 designates a workpiece.

First, in the axial position Pt(0) (mm) at time 0 (sec), the cutting edge feed velocity is "0". Calculation in the step S31, that is, calculation of distance from the start point at time tc (sec) is executed by use of the axial feed velocity obtained in the form of axial feed velocity F2 (mm/min) or axial feed limit velocity F2' (mm/min) by the step S25 or S26.

Incidentally, as is to be understood from the steps S24 and S25, the value of F2 is obtained by use of the rotational velocity n1 of the main shaft obtained on the assumption of cutting velocity Vc at position Pt. For example, as shown in FIG. 6, a value indicating the feed velocity of the cutting edge of the cutter B at Pt(0) is calculated. In the series of processes, the start point is set and a next point is obtained on the basis of the start point. For example, Pt(0) is set and Pt(tc) is obtained on the basis of Pt(0). In this case, in accordance with the calculation expression in the step S25, n1 at Pt(tc) must be calculated to obtain the tool post feed velocity at Pt (tc). For this calculation, Pt(tc) needs to be a known value at the point of time when the calculation is executed. It is however impossible to use Pt(tc) as a known value for the calculation because the series of processes aims at obtaining the value of Pt(tc).

Therefore, in this embodiment, n1 is calculated on the basis of known coordinates one-cycle previous to coordinates to be obtained, for example, on the basis of Pt(0) one-cycle previous to P(tc). The reason why such a calculating method is used is as follows. That is, experimentally, the time pitch tc used for calculating coordinates is sufficiently small, so that change in cutter feed velocity between Pt(tc) and Pt(0) is not large. Accordingly, the aforementioned calculating method is used judging from the fact that error from the proper value has no influence on the control target. That is, the calculation can be made on the assumption that the cutter feed velocity at Pt(tc) is equal to the cutter feed velocity at Pt(0).

Incidentally, the value of F2' can be calculated in the same manner as the value of F2. Although the feed velocity F2' can be calculated by a simple operation of putting updated tc in the calculation expression, consistency cannot be secured between the coordinates calculated on the basis of F2' and the coordinates calculated on the basis of F2 if only the simple operation is used for calculating the value of F2'. Accordingly, the value of F2' is calculated in the same manner as the value of F2.

The calculation is based on the following expression (VII) or (VIII). That is, when the axial feed limit velocity F2' (mm/min) is selected in the case of F2≧F2' as a result of the judgment in the step S27, the calculation is executed on the basis of the expression (VII):

$$S=\{(F2')^2-Vo^2\}/2\alpha \quad (VII)$$

in which S is distance from the start point at time {t+tc (sec)}, F2 is the axial feed velocity (mm/min), F2' is the axial feed limit velocity (mm/min), Vo is the cutting velocity at axial position Pt, and α is a constant indicating limit acceleration defined as the capacity of a motor.

On the other hand, when the axial feed velocity F2 (mm/min) is selected in the case of F2<F2' as a result of the judgment in the step S27, the calculation is executed on the basis of the expression (VIII):

$$S=\{(F2)^2-Vo^2\}/2\alpha' \quad (VIII)$$

in which α' is a value given by the expressions α'=(F2−Vo) 60/tc, S is distance from the start point at time {t+tc (sec)}, F2 is the axial feed velocity (mm/min), F2' is the axial feed limit velocity (mm/min), and Vo is the cutting velocity (mm/min) at axial position Pt.

Incidentally, in the calculation according to the expression (VII) or (VIII), the values of the axial feed velocity F2 (mm/min) and the axial feed limit value F2' (mm/min) obtained by the steps S25 and S26 as described above are used directly for predicting the feed velocity at time t+tc.

The distance S obtained in this manner is used for performing calculation in the step S32, that is, calculation of position at time {t+tc (sec)}. This calculation will be described with reference to FIG. 6.

First, assume that (a, b, c) are coordinates of an axial position Pt(0) (mm) as the start point of constant circumferential velocity control at time 0 (sec), and that (Xtc, Ytc, Xtc) are coordinates of an axial position Pt(tc) (mm) at time tc (sec). Further, calculation of position in the step S32 is executed through calculation of internally dividing points so that error generated in the repeated calculation of the distance S at time mtc (sec) (in which m is a positive integer) is prevented from being accumulated.

Incidentally, assume that ($X_E$, $Y_E$, $Z_E$) are coordinates of Pt(ntc) when constant circumferential velocity control is terminated. (Constant circumferential velocity control is terminated at the timing in which the control rotational velocity of the main shaft motor approaches its upper limit value.) Both Pt(0) and Pt(ntc) have known values (coordinates) which can be acquired from the NC program as a source of transformation before the calculation is executed. Accordingly, the step S32 is provided as the step of obtaining one of points forming a locus between the known points (coordinates).

In machining shown in FIG. 6, the following expressions (IX) and (X) hold.

$$Y=Ytc=Y_E \quad (IX)$$

$$Z=Ztc=Z_E \quad (X)$$

When attention is paid to only the X coordinate, the X coordinate is calculated by the following expression (XI).

$$Xtc=a+S \quad (XI)$$

This calculation is simple because of one-dimensional calculation of X. When calculation is executed three-dimensionally, the calculation is complicated.

While the condition for termination of constant circumferential velocity control in the step S34 is not satisfied, the steps S24 to S33 are repeated. Whenever only tc is added to the time t, the distance is increased by S. The accumulated value obtained by adding S obtained in this cycle to S obtained in the previous cycle is substituted for S in the expression XI of the internally dividing point to thereby calculate the coordinate value of Xtc.

Incidentally, in this embodiment, constant circumferential velocity control is terminated when a judgment is made that Xtc is nearer to the center of the main shaft than $X_E$.

As described above, in accordance with the second embodiment, in addition to the effect the same as that of the first embodiment, the health of the apparatus can be kept good effectively because the axial feed limit velocity F2' (mm/min) is calculated and examined.

Incidentally, the invention is not limited to the first and second embodiments.

Because the mechanical configuration in each of the first and second embodiments is taken as only an example, the invention is not limited thereto.

The configuration shown in each of drawings is also taken as an example.

As described above in detail, in the numerical control apparatus for machine tool and in the numerical control method for machine tool according to the invention, first, constant circumferential velocity control can be executed even in an operating mode using electronic cam data. As a result, improvement in machining accuracy can be attained.

Moreover, efficiency in transformation of the NC program into the electronic cam program can be improved to thereby make a great contribution to improvement in machining efficiency as a whole.

In addition, when the axial feed limit velocity is calculated and examined, it is effective in keeping the health of the apparatus good.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A numerical control apparatus for machine tool, comprising:
   an NC program storage portion for storing an NC program generated for machining a material into a desired shape;
   an electronic cam data transformation unit which transforms the NC program stored in the NC program storage portion into electronic cam data;
   a constant circumferential velocity control command detection unit which detects whether a command for executing constant circumferential velocity control to keep the velocity of cutting substantially constant during cutting is present or not in the NC program stored in the NC program storage portion;
   a reference axis pitch setting unit which sets the pitch for generating data;
   a main shaft rotational velocity calculation unit which calculates the rotational velocity of a main shaft on the basis of parameters corresponding to the position of a cutting edge of a tool on the assumption that the velocity of cutting is kept at a desired value when a constant circumferential velocity control command is detected by the constant circumferential velocity control command detection unit;
   an axial feed velocity calculation unit which calculates axial feed velocity on the basis of the rotational velocity of the main shaft calculated by the main shaft rotational velocity calculation unit; and
   an axial position data computing unit which calculates axial position on the basis of the axial feed velocity obtained by the axial feed velocity calculation unit at intervals of the pitch set by the reference axis pitch setting unit.

2. The numerical control apparatus for machine tool according to claim 1, further comprising an axial feed limit velocity calculation unit which calculates a limit value of the axial feed velocity, wherein the axial position data computing unit compares the axial feed velocity calculated by the axial feed velocity calculation unit with the limit value of the axial feed velocity calculated by the axial feed limit velocity calculation unit and calculates axial position so that the axial feed velocity does not exceed the limit value of the axial feed velocity.

3. The numerical control apparatus for machine tool according to claim 2, wherein the axial position data computing unit compares the axial feed velocity calculated by the axial feed velocity calculation unit with the limit value of the axial feed velocity calculated by the axial feed limit velocity calculation unit and calculates axial position so that the axial feed velocity is selected when the axial feed velocity is smaller than the limit value of the axial feed velocity but the limit value of the axial feed velocity is selected when the axial feed velocity is not smaller than the limit value of the axial feed velocity.

4. The numerical control apparatus for machine tool according to claim 2, wherein the limit value of the axial feed velocity is decided on the basis of the performance of an axial drive motor.

5. A numerical control method for machine tool, comprising the steps of:
   (a) reading an NC program; and
   (b) transforming the NC program read by the step (a) into electronic cam data, wherein the step (b) includes the sub-steps of:
   (b-1) detecting whether a command for executing constant circumferential velocity control to keep cutting velocity substantially constant during cutting is present or not in the NC program;
   (b-2) setting a pitch for generating data;
   (b-3) calculating the rotational velocity of a main shaft on the basis of parameters corresponding to the position of a cutting edge of a tool on the assumption that the cutting velocity is kept at a desired value when the constant circumferential velocity control command is detected by the step (b-1);
   (b-4) calculating axial feed velocity on the basis of the rotational velocity of the main shaft calculated by the step (b-3); and
   (b-5) calculating axial position on the basis of the axial feed velocity at intervals of the data generation pitch.

6. The numerical control method for machine tool according to claim 5, further comprising the steps of:
   (c) calculating a limit value of the axial feed velocity; and
   (d) comparing the calculated axial feed velocity with the limit value of the axial feed velocity and calculating axial position so that the axial feed velocity does not exceed the limit value of the axial feed velocity.

7. The numerical control method for machine tool according to claim 6, wherein the step (d) includes the sub-steps of:
   (d-1) comparing the calculated axial feed velocity with the limit value of the axial feed velocity and calculating axial position so that the calculated axial feed velocity is selected when the calculated axial feed velocity is smaller than the limit value of the axial feed velocity; and
   (d-2) comparing the calculated axial feed velocity with the limit value of the axial feed velocity and calculating axial position so that the limit value of the axial feed velocity is selected when the calculated axial feed velocity is not smaller than the limit value of the axial feed velocity.

8. The numerical control method for machine tool according to claim 6, wherein the limit value of the axial feed velocity is decided on the basis of the performance of an axial drive motor.

* * * * *